United States Patent [19]
Kasai et al.

[11] Patent Number: 5,322,430
[45] Date of Patent: Jun. 21, 1994

[54] MOLD CLAMPING DEVICE IN INJECTION MOLDING MACHINE

[75] Inventors: Toshihiro Kasai, Numazu; Shinichi Tazawa, Mishima, both of Japan

[73] Assignee: Toshiba Kikai Kabushiki Kaisha, Tokyo, Japan

[21] Appl. No.: 11,495

[22] Filed: Jan. 29, 1993

[30] Foreign Application Priority Data

Jan. 30, 1992 [JP] Japan ................... 4-2994[U]
Mar. 2, 1992 [JP] Japan ................... 4-44873

[51] Int. Cl.$^5$ ........................... B29C 45/64
[52] U.S. Cl. ........................... 425/3; 100/917; 425/589; 425/595; 425/DIG. 33
[58] Field of Search ............ 100/219, 917; 425/3, 425/589, 595, 450.1, 451.9, DIG. 33

[56] References Cited

U.S. PATENT DOCUMENTS

| | | | |
|---|---|---|---|
| 2,951,437 | 9/1960 | Diener | 100/917 |
| 3,887,312 | 6/1975 | Seary | 425/3 |
| 4,008,021 | 2/1977 | Fedrigo et al. | 425/DIG. 33 |
| 5,007,814 | 4/1991 | Saunders et al. | 425/3 |

FOREIGN PATENT DOCUMENTS

| | | | |
|---|---|---|---|
| 1332027 | 6/1963 | France | 425/3 |
| 46-25262 | 7/1971 | Japan . | |
| 61-154822 | 7/1986 | Japan . | |
| 61-193821 | 8/1986 | Japan . | |

*Primary Examiner*—Charles S. Bushey
*Assistant Examiner*—James P. Mackey
*Attorney, Agent, or Firm*—Cushman, Darby & Cushman

[57] ABSTRACT

A mold clamping device in an injection molding machine comprising a stationary electromagnetic plate and a movable electromagnetic plate provided at the side of the stationary electromagnetic plate away from the movable platen so as to be capable of being moved toward and away from the stationary electromagnetic plate. Both electromagnetic plates are each provided with an electromagnetic coil for generating a magnetic attracting force. The device further comprises a movable platen driving mechanism which is composed of a combination of a feed screw shaft and a nut member and is connected to the movable platen. An operation for closing the molds is performed by the driving mechanism. Subsequently, a mold clamping operation of both molds is performed by a magnetic attracting force from the electromagnetic coil.

5 Claims, 7 Drawing Sheets

MOLD CLAMPING DEVICE IN INJECTION MOLDING MACHINE

FIELD OF THE INVENTION

This invention relates to a mold clamping device in an injection molding machine, and more particularly to a mold clamping device in which the clamping of a pair of metal molds is performed using a magnetic attracting force.

BACKGROUND OF THE INVENTION

In an injection molding machine, a die casting machine or the like, the pair of molds therein must be kept in a closed state when a molding product is being molded. In order to maintain the molds in the closed state against a greater inner pressure produced within the molds, a mold clamping operation to press the pair of molds towards each other by strong forces from the opposite sides is necessary. For this reason, in a molding device in the injection molding machine or the like, a mold clamping device for maintaining the molds in the closed state during the molding operation is provided together with an injection device for injecting a raw molding material in a molten state.

Such a conventional mold clamping device is known, for example, from JPA-61-193821, in which a nut member secured to a movable platen is provided with a ball screw, which is driven in a forward rotation or a reversing rotation by means of a servo motor while the torque of the servo motor is controlled so that the compressibility of the ball screw is controlled, thereby enabling the mold clamping force to be controlled.

However, since this type of mold clamping device attempts to provide a greater force, which is necessary to clamp the molds by the servo motor, there is a problem of requiring a motor with a greater horsepower.

To deal with this problem, as disclosed in, for example, JPB-46-25262 or JPA-61-154822, mold clamping devices are proposed in which the clamping of the metal molds is performed by the use of a magnetic attracting force.

However, the conventional mold clamping device in which the clamping of the metal molds is performed by the use of a magnetic attracting force has a disadvantage in that change in the thickness of the metal molds results in change either in the relative position of the magnetic means used to produce the magnetic attracting force or in the relative position between the electromagnet and the attracted part, thereby providing a mold clamping force only at a specific position. Thus, in such a type of conventional mold clamping device, there are further disadvantages in that an operation of adjusting the thickness of the molds is necessary every time the metal molds are changed and, at the same time, the construction of the device becomes complicated and changes of the metal molds are not easy.

SUMMARY OF THE INVENTION

It is an object of the invention to provide a mold clamping device in an injection molding machine, which is capable of surely providing a mold clamping force without adjusting the thickness of the molds, even in the case where the molds are changed in thickness, and which is capable of simplifying the troublesome work of changing the molds in order to shorten the time for changing thereof.

The present invention provides a mold clamping device in an injection molding device comprising a stationary platen on which a stationary side mold is mounted; a movable platen on which a movable side mold is mounted in a position opposite the stationary side mold; a stationary electromagnetic plate disposed in a position away from the stationary platen with the movable platen interposed therebetween; a movable electromagnetic plate arranged opposite the side of the stationary electromagnetic plate generating a magnetic attracting force, and movable relative to the stationary electromagnetic plate; a magnetic attracting force generating means provided in at least one of either the stationary electromagnetic plate or the movable electromagnetic plate; tie bar means arranged between the stationary platen and the stationary electromagnetic plate, for guiding the movement of the movable platen; and a platen driving means for moving the movable platen.

In the mold clamping device in an injection molding machine according to the invention, a nut member or a feed screw shaft is driven in a forward rotation or a reversing rotation by a driving source so that a further feed screw shaft or a further nut member is threadably moved and, at the same time, the movable platen integrally formed therewith is moved in rectilinear motion along the tie bars to thereby perform an operation for closing or opening both of the molds.

On the other hand, in the closed condition of the molds, when an absorbing force is applied between both of the electromagnetic plates by the magnetic attracting force of the magnetic attracting force generating means, it is transmitted through the nut member and the feed screw shaft to the movable platen, thereby providing a greater mold clamping force between both of the molds.

BRIEF DESCRIPTION OF DRAWINGS

These and other objects and features of the invention will become apparent upon a reading of the following detailed specification and drawing, in which.

PREFERRED EMBODIMENT OF THE INVENTION

Now, one embodiment of the invention will be explained with reference to the drawings.

Figure 1:
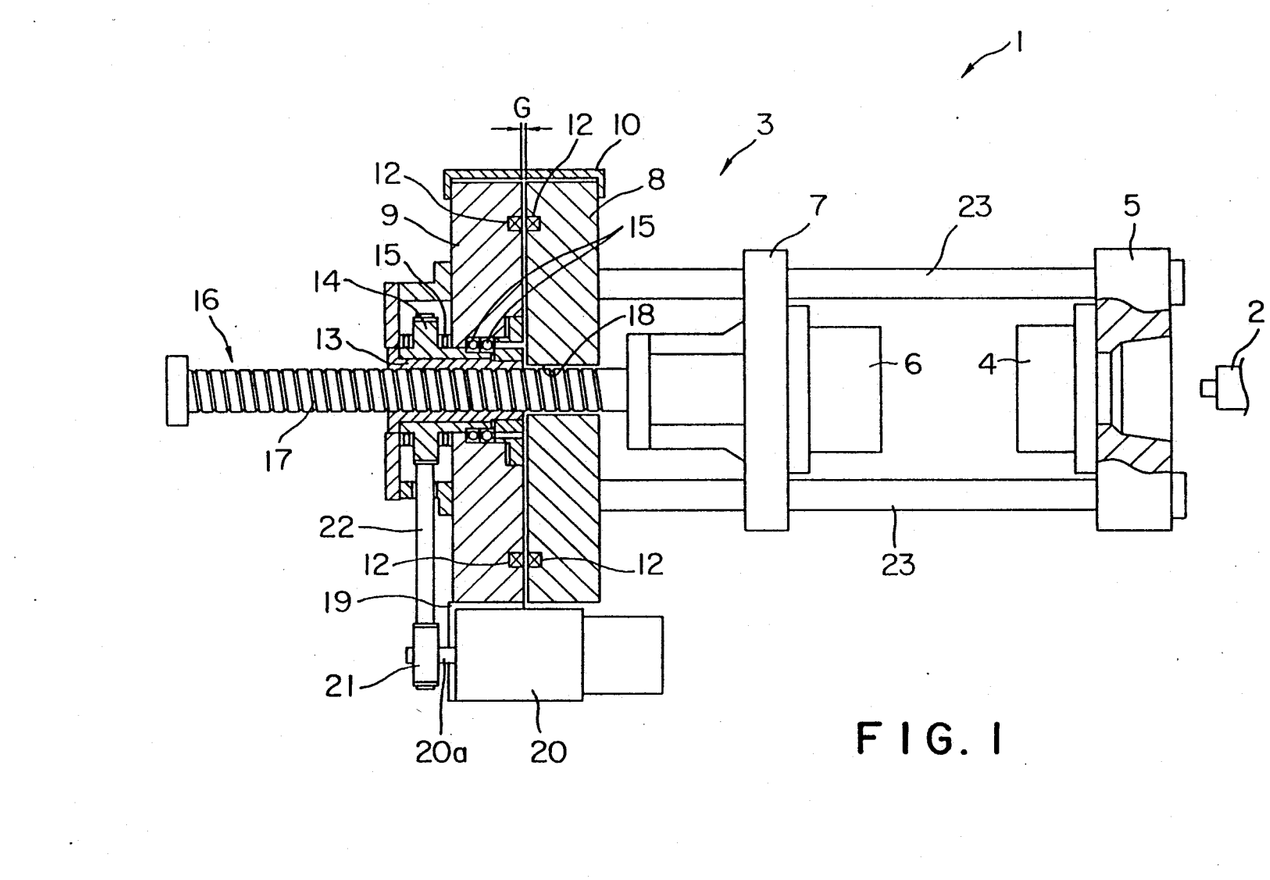
FIG. 1 is a side view, partly in section, of an embodiment of an injection molding machine according to the invention.
Figure 2:
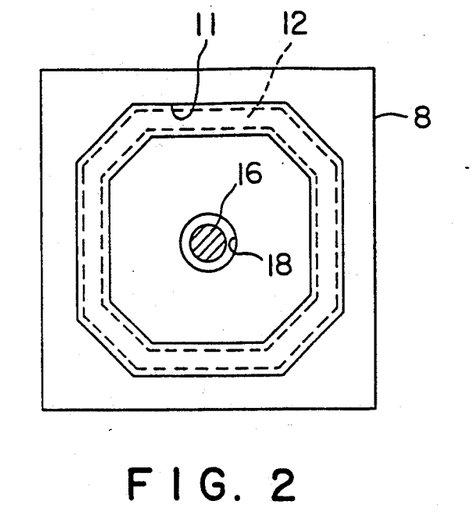
FIG. 2 is a view of a stationary electromagnetic plate as perceived from an air gap side.

Referring to FIG. 1, which shows an example of an injection molding machine according to the invention, this machine 1 comprises an injection device 2 and a mold clamping device 3, which are mounted on a frame not shown.

The injection device 2 is a device for injecting a molten material between metal molds 4 and 6 which will be described later, and is adapted to be able to be moved to the right or to the left in FIG. 1.

The mold clamping device 3 comprises a stationary platen 5 on which the stationary metal mold 4 is detachably held and a movable platen 7 on which the movable metal mold 6 is detachably held. The stationary platen 5 is fixedly secured to a frame not shown and the movable platen 7 is adapted to be moved in rectilinear motion relative to the stationary platen 5 to thereby perform operations for closing and opening both of the molds 4 and 6.

A stationary electromagnetic plate 8 is provided at the side of the movable platen 7 away from the stationary platen 5 and is firmly mounted on the frame not shown. A movable electromagnetic plate 9 is arranged at the side of the stationary electromagnetic plate 8 away from the movable platen 7 in a manner opposite the stationary electromagnetic plate 8.

The movable electromagnetic plate 9 is slidably moved toward and away from the stationary electromagnetic plate 8 within a predetermined range regulated by a stopper 10 mounted on both the stationary and movable electromagnetic plates 8 and 9, leaving an air gap "G" of 1 mm or less than 1 mm between both plates in the most separated condition.

Figure 3:
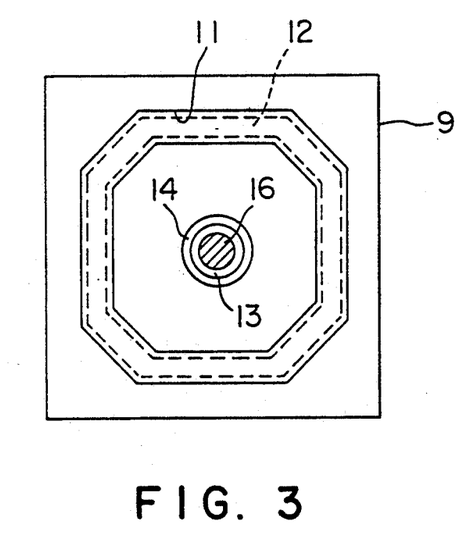
FIG. 3 is a view of a movable electromagnetic plate as perceived from an air gap side.

Both of the electromagnetic plates 8 and 9 are provided, on each of the surfaces facing each other, with an annular groove 11, for example, in the form of an octagon, as shown in FIG. 1 or 3, and each annular groove 11 has therein an electromagnetic coil 12 for generating a magnetic attracting force.

Figure 4:
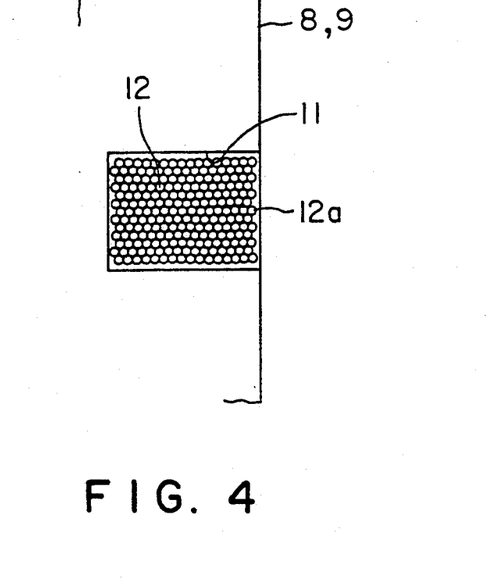
FIG. 4 is an fragmentary enlarged sectional view illustrating a mounted condition of an electromagnetic coil.

Each electromagnetic coil 12 is disposed within the annular groove 11 with a wire being continuously wound around, as shown in FIG. 4, and the outermost surface 12a thereof is set at a position retired an insignificant distance from the opening end of the annular groove 11 and is entirely solidified with synthetic resin to be firmly fitted in the annular groove 11.

As shown in FIGS. 1 and 3, a toothed pinion pulley 14 with a nut member 13 fixedly secured to the inner periphery thereof is rotatably mounted in the center of the movable electromagnetic plate 9 through bearings 15, and the nut member 13 is engaged by a feed screw shaft 16, for example, a ball screw or the like having an external threaded portion 17 over the entire length. The feed screw shaft 16 extends through an opening 18 at the center of the stationary electromagnetic plate 8 with a clearance therebetween and is secured at the end thereof to the movable platen 7.

The movable electromagnetic plate 9 is provided thereon with a feed motor 20 through a bracket 19, as shown in FIG. 1, and a toothed pulley 21 mounted on an output shaft 20a of the feed motor 20 is connected to the toothed pinion pulley 14 through an endless timing belt 22. Driving the feed motor 20 to rotate the nut member 13 forward or backward causes the movable platen 7 to be moved rectilinearly with respect to the stationary platen 5, so that the operations for closing and opening both of the molds 4, 6 may be carried out. The feed motor 20 is provided therein with a brake (not shown) for locking the movable electromagnetic plate 9 to the feed screw shaft 16 in the closed condition of the molds. For example, four tie bars 23 are installed between the stationary platen 5 and the stationary electromagnetic plate 8, and the movable platen 7 is guided by and slidably moved along the tie bars 23.

Now, the operation of the present embodiment will be described.

For closing both molds 4 and 6, the feed motor 20 is first driven to rotate the nut member 13 through the toothed pulley 21, the timing belt 22 and the toothed pinion pulley 14. Since the feed screw shaft 16 is fixed to the movable platen 7 at the end thereof and, accordingly, can not be rotated, the rotation of the nut member 13 causes the movable platen 7 to be rectilinearly moved along the tie bars 23 while being guided by the same, so that the metal mold 6 on the movable platen 7 is moved toward the metal mold 4 on the stationary platen 5 until they are brought into engagement with each other to thereby be closed.

With the closed condition of both molds 4 and 6, the brake of the feed motor 20 is actuated to prevent rotation of the nut member 13, thereby locking the movable electromagnetic plate 9 to the feed screw shaft 16. At this moment, the feed screw shaft 16 is subjected to a force which presses it to the left in FIG. 1 due to a reaction force which takes place when the molds are closed, and accordingly, the movable electromagnetic plate 9 is moved away from the stationary electromagnetic plate 8 to the position where it is regulated by the stopper 10.

Upon a subsequent supply of electric current to the electromagnetic coil 12, a magnetic attracting force is generated between both of the electromagnetic coils 12. This causes the movable electromagnetic plate 9 to be attracted toward the stationary electromagnetic plate 8. Since the movable electromagnetic plate 9 is connected to the movable platen 7 through the feed screw shaft 16 and the stationary electromagnetic plate 8 is connected to the stationary platen 5 through the tie bars 23, the magnetic attracting force between both of the electromagnetic plates 8 and 9 is actuated as a mold clamping force of both platens. This mold clamping force is adjusted by controlling the value of current supplied to both of the electromagnetic coils 12 to control the magnetic attracting force.

After completion of the mold clamping operation of both metal molds 4 and 6, the injection device 2 is brought close to the stationary platen 5 until the nozzle thereof is brought into abutting engagement with an inlet of a cavity within the metal molds. Then, molten raw material, for example, molten resin, is poured into the metal molds.

After completion of the injection molding operation, the supply of electric current to both of the electromagnetic coils 12 is stopped in order to dissolve the magnetic attracting force and, at the same time, a demagnetizing current is supplied to both of the electromagnetic coils 12 to cause the magnetic attracting force to disappear due to residual magnetic flux of the electromagnet pole.

Subsequently, the feed motor 20 is driven in the direction of rotation reverse to that of when the molds are closed, thereby rotating the nut member 13 in the reverse direction. This causes the movable platen 7 to be moved away from the stationary platen 5, thereby performing the operation for opening both of the molds 4 and 6.

In this way, since rotation of the nut member 13 attached to the movable electromagnetic plate 9 causes the feed screw shaft 16 to be moved to thereby move the movable platen 7 so that the operations for closing and opening both of the molds 4 and 6 are performed, a mold clamping force can be surely provided without requiring any adjustment in the thickness of the molds even in the case where the metal molds 4 and 6 are changed in thickness.

In addition, since the feed motor 20 only undertakes movement of the movable platen 7, which does not require any great force, and the mold clamping operation, which requires a greater force, is performed by the use of a magnetic attracting force, a motor with smaller horsepower can be used for the feed motor 20, resulting in a device of smaller-size and light weight.

Moreover, since both of the electromagnetic plates 8 and 9 for generating a magnetic attracting force are arranged at the side of the movable platen 7 away from the stationary platen 5, they do not get in the way when the metal molds 4 and 6 are exchanged.

Figure 5:
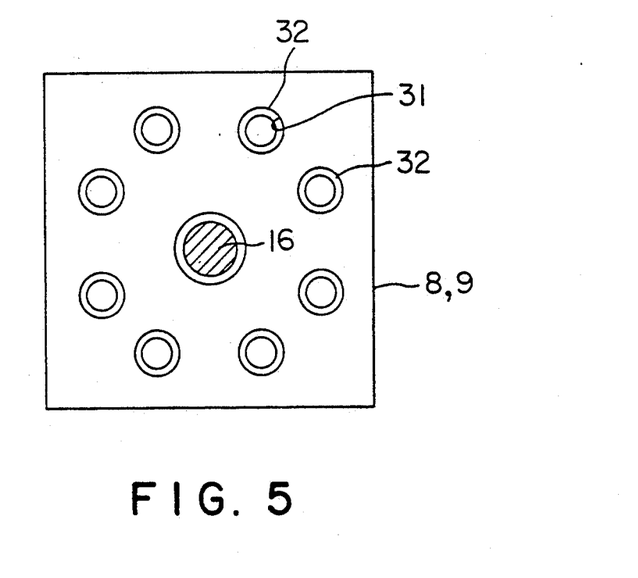
FIG. 5 is an explanation view showing an example of an electromagnetic coil constituted by a combination of a plurality of smaller-sized electromagnetic coils.

In the embodiment as described above, the electromagnetic coils 12 are disposed within the annular grooves 11, however, for example, as shown in FIG. 5, the electromagnetic coils may be constituted by a combination of a plurality of smaller-sized electromagnetic coils 32, which are each arranged in a dispersed manner in a plurality of circular grooves 31 spaced in the peripheral direction.

Figure 6:
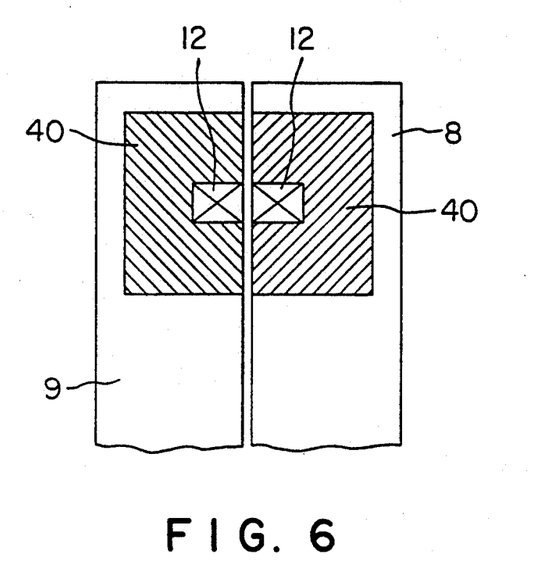
FIG. 6 is an explanation view showing an example of materials greater in terms of the maximum magnetic flux density arranged in the periphery of the electromagnetic coils.

Furthermore, in the embodiment as described above, the electromagnetic coils 12 are placed directly in each of the electromagnetic plates 8 and 9, however, as shown in FIG. 6, groove-like members 40 made of a material great in terms of the maximum magnetic flux density, for example, pure iron, may be disposed in the outer periphery of the electromagnetic coils 12 to thereby design an increase in a magnetic attracting force.

Figure 7:
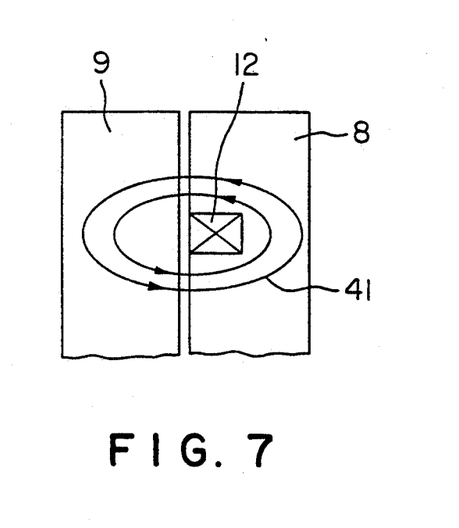
FIG. 7 is an explanation view showing an example in which an electromagnetic coil is arranged only in one of the electromagnetic plates.

Further, in the embodiment as described above, the electromagnetic coils 12 are installed in both of the electromagnetic plates 8 and 9, however for example, as shown in FIG. 7, the electromagnetic coil 12 may be placed only in the stationary electromagnetic plate 8. With the construction as stated above, the lines of magnetic force (magnetic flux) are formed extending over both of the electromagnetic plates 8 and 9, providing a desired magnetic attracting force and, at the same time, permitting simplification of the construction in manufacturing and electrical wiring.

Figure 8:
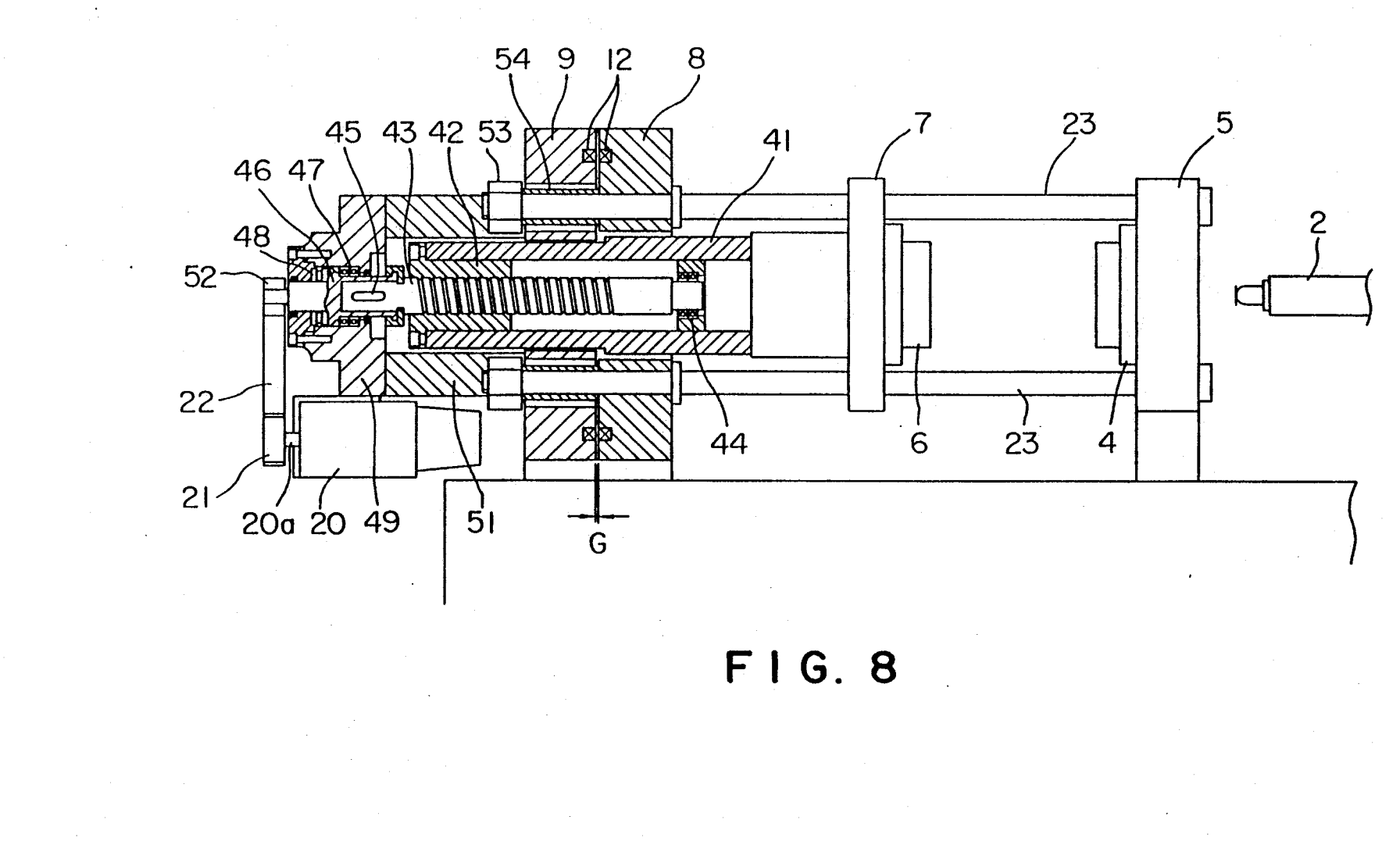
FIG. 8 is a view corresponding to FIG. 1 showing a second embodiment of the invention.

FIG. 8 is a view corresponding to FIG. 1 showing another embodiment of the invention. The present embodiment is the same as the aforementioned embodiment in that a combination of the feed screw shaft and the nut member which engages therewith is used as a mechanism for moving the movable platen, however differs from the aforementioned embodiment, in which the nut member is driven in rotation, in that the feed screw shaft is driven in rotation. In the description as stated below, the same numerals are used for the same parts as those in the embodiment shown in FIG. 1 and the explanation thereof is omitted.

The movable platen 7 is fixedly provided at the back end thereof with a hollow cylindrical bracket 41 which extends backward through the stationary electromagnetic plate 8 and the movable electromagnetic plate 9 with clearances therebetween. The bracket 41 has at the back end thereof a nut member 42 fitted therein and fixed thereto, and a feed screw shaft 43 threadably engaged by the nut member 42 is inserted in the bracket 41 from the back side thereof and is rotatably supported at the front end thereof by bearings 44 provided within the bracket 41. In the present embodiment, the bracket 41 and the nut member 42 are constituted by separate members, however they may be manufactured by the one and same member.

A drive shaft 46 is fitted in the back end of the feed screw shaft 43, and a key 45 is placed between the drive shaft 46 and the feed screw shaft 43. The drive shaft 46 is rotatably supported but in a condition restrained in the axial movement, by bearings 47 and a thrust bearing 48. These bearings 47 and 48 are held within a bearing housing 49, which is connected through a hollow cylindrical bracket 51 to the movable electromagnetic plate 9.

The drive shaft 46 has at the back end thereof a toothed pinion pulley 52 mounted thereon, which is connected through a timing belt 22 to a toothed pulley 21 secured to a feed motor 20 provided on the bearing housing 49.

Four tie bars 23 extend through the stationary and movable electromagnetic plates 8 and 9, and have at the back end thereof nut members 53 threadably connected thereon to restrain the backward movement of the movable electromagnetic plate 9. Hollow cylindrical collars 54 are interposed between the tie bars 23 and the movable electromagnetic plate 9. Each collar 54 serves to ensure an air gap of approximately 1 mm, for example, between the stationary electromagnetic plate 8 and the movable electromagnetic plate 9.

In the present embodiment, upon drive of the feed motor 20, a torque is transmitted through the timing belt 22 to rotate the drive shaft 46. The rotation of the drive shaft 46 causes the feed screw shaft 43 to be rotated, and the nut member which engages therewith is moved in the axial direction of the feed screw shaft 43. With the movement of the nut member 42, the bracket 41 is moved and the movable platen 7 is moved toward the stationary platen 5 along the tie bars 23.

After the operation for closing the metal molds 4 and 6, a mold clamping operation is performed in such a manner that the electromagnetic coils 12 are supplied with electric current to generate a magnetic attracting force and to bring both the electromagnetic plates 8 and 9 close to each other, similarly as in the embodiment described above. That is, upon a movement of the movable electromagnetic plate 9 toward the stationary electromagnetic plate 8, it is transmitted to the movable platen 7 through the bracket 51, the bearing housing 49, the feed screw shaft 43, the nut member 42 and the bracket 41.

In the present embodiment, since the feed screw shaft 43 is driven in rotation to move the movable platen 7, an inertia of rotation becomes smaller as compared with the aforementioned embodiment in which the nut member 42 is driven in rotation, and therefore this embodiment is advantageous for the rise time characteristic of the feed motor 20.

Figure 9:
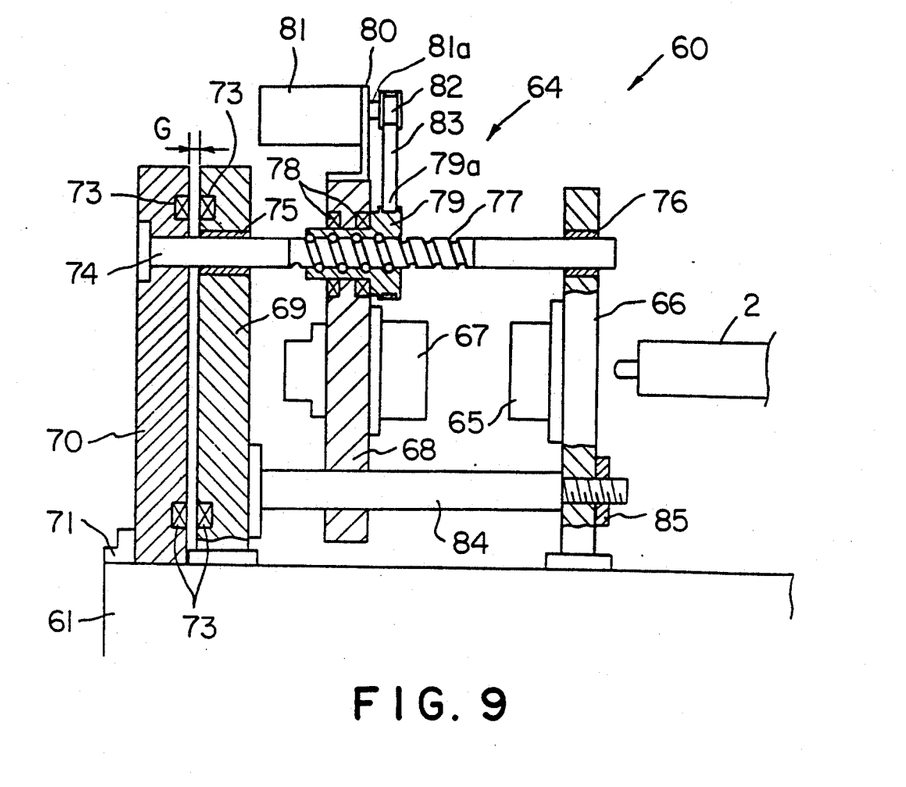
FIG. 9 is a view corresponding to FIG. 1 showing a third embodiment of the invention.

FIG. 9 shows a third embodiment of the invention.

The injection device 2 is a device for injecting a molten material into a pair of molds 65 and 67, which will be described later, and is adapted to be moved on a frame 61 to the right or to the left in FIG. 9 by a driving mechanism not shown.

A mold clamping device 64 comprises a stationary platen 66 on which a stationary mold 65 is detachably held and a movable platen 68 on which a movable metal mold 67 is detachably held, and the movable platen 68 is moved in rectilinear motion relative to the stationary platen 66 to perform the operation for closing or opening both the molds 65 and 67.

A stationary electromagnetic plate 69 is vertically provided on the frame 61 at the side of the movable platen 68 away from the stationary platen 66 and a movable electromagnetic plate 70 is disposed at the side of the stationary electromagnetic plate 69 away from the movable platen 68 in a manner opposite to the stationary electromagnetic plate 69. The movable electromagnetic plate 70 is slidably moved toward and away from the stationary electromagnetic plate 69 between the stopper 71 installed on the frame 61 and the stationary electromagnetic plate 69, and when it comes into an abutting engagement with the stopper 71, an air gap of 1 mm and less than 1 mm is adapted to be formed between the stationary and movable electromagnetic plates 69 and 70.

Figure 10:
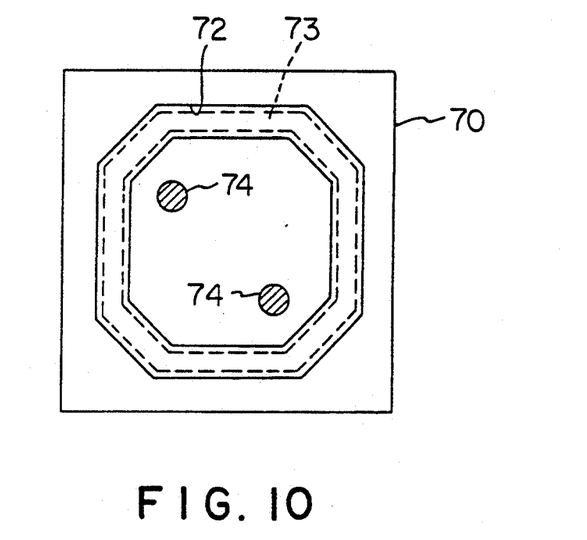
FIG. 10 is a view of a movable electromagnetic plate as viewed from an air gap side.
Figure 11:
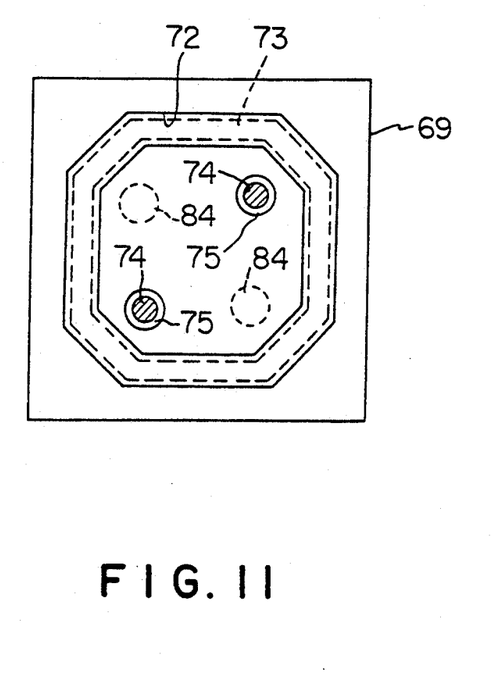
FIG. 11 is a view of a stationary electromagnetic plate as viewed from an air gap side.

As shown in FIGS. 9 to 11, both of the electromagnetic plates 69 and 70 are provided, on each of the surfaces facing each other, with an annular groove 72, for example, in the form of an octagon, and an electromagnetic coil 73 for generating a magnetic attracting force is placed in each of the annular grooves 72.

The base end portion of the feed screw shaft is passed through and fixed to the movable electromagnetic plate 70 at two diagonal positions thereof, as shown in FIGS. 9 to 10, and a portion near the base end of the feed screw shaft 74 is axially slidably supported on the stationary electromagnetic plate 69 through a bearing 75, as shown in FIGS. 9 and 11, and at the same time, the front end of the feed screw shaft 74 is axially slidably supported on the stationary platen 66 through a bearing 76.

Furthermore, as shown in FIG. 9, a part of the feed screw shaft 74 passing through the movable platen 68 is provided with an external thread 77, which is threadably engaged by a nut member 79 rotatably mounted in the movable platen 68 through bearings 78.

In addition, the movable platen 68 is provided thereon with a feed motor 81 through a bracket 80, and a toothed pulley 82 mounted on an output shaft 81a of the feed motor 81 is connected through an endless timing belt 83 to a toothed pulley 79a formed on the nut member 79. Upon drive of the feed motor 81, the nut member 79 is rotated in a forward rotation or a backward rotation so that the movable platen 68 is moved in rectilinear movement, thereby performing an operation for closing or opening both of the metal molds 65 and 67. The feed motor 81 is provided therein with a brake (not shown) for locking the feed screw shaft 74 to the movable platen 68 in the condition where the molds are closed.

A base end portion of a tie bar 84 for slidably guiding the movable platen 68 is fixedly provided on the stationary electromagnetic plate 69 at two diagonal positions intersecting perpendicularly to the feed screw shaft 74, and the front end of the tie bar 84 is fastened to the stationary platen 66 by a nut 85.

The operation of the present embodiment will be described.

For closing both the metal molds 65 and 67, the feed motor 81 is first driven to rotate the nut member 79. Since the feed screw shaft 74 is secured at the base end thereof to the movable electromagnetic plate 70 and can not be rotated, the rotation of the nut member 79 causes the movable platen 68 to be moved in rectilinear motion while being guided by the feed screw shaft 74 and the tie bar 84, until the movable side metal mold 67 is brought close to and into contact with the stationary side metal mold 65. Upon further rotation of the feed motor 81, the feed screw shaft 74 is subjected to a force which presses it to the left in FIG. 9, and accordingly, the movable electromagnetic plate 70 is moved to the position where it comes into an abutting engagement with the stopper 71, so that a predetermined amount of air gap "G" is kept.

Hereupon, the brake of the feed motor 81 is actuated to prevent rotation of the nut member 79 and lock the movable platen 68 to the feed screw shaft 74.

A subsequent supply of electric current to the electromagnetic coil 73 generates a magnetic attracting force between both of the electromagnetic coils 73. This causes the movable electromagnetic plate 70 to be attracted to the stationary electromagnetic plate 69. Since the movable electromagnetic plate 70 is connected to the movable platen 68 through the feed screw shaft 74 and the stationary electromagnetic plate 69 is connected to the stationary platen 66 through the tie bar 84, the magnetic attracting force between both of the electromagnetic plates 69 and 70 acts on the molds as a mold clamping force. This mold clamping force can be adjusted by controlling the value of current supplied to both the electromagnetic coils to control a magnetic attracting force.

After completion of the mold clamping operation of the molds 65 and 67, the injection device 63 is brought close to the stationary platen 66 until the nozzle thereof comes into contact with an inlet of a cavity within the molds. Then, a molten material, for example, molten resin, is poured into the molds.

After completion of the injection molding operation, a supply of electric current to both the electromagnetic coils 73 is stopped to dissolve the magnetic attracting force and, at the same time, a demagnetizing current is supplied to both electromagnetic coils 73 to cause the magnetic attracting force to vanish due to residual magnetic flux of the electromagnet.

Subsequently, the feed motor 81 is driven in rotation in the direction of rotation reverse to that of when the operation for closing the molds is made, thereby rotating the nut member in the reverse direction. This causes the movable platen 68 to be moved in rectilinear motion in the direction away from the stationary platen 66 to thereby perform the operation for opening both molds 65 and 67.

In this way, since the movable platen 68 is moved along the feed screw shaft 74 to close or open both molds 65 and 67, differing from the device in the prior art, a mold clamping operation can be performed without providing a mechanism for adjusting the thickness of the molds, even in the case where the molds 65 and 67 are changed in thickness.

Furthermore, the feed mechanism for the movable platen, which is provided between the feed screw shaft and the movable platen, makes it possible to shorten the longitudinal dimension of the device. In addition, since the feed mechanism only undertakes the movement of the movable platen 68 which does not require a great force and the mold clamping operation which requires a greater force is performed using a magnetic attracting force, the smaller-sized feed mechanism can be produced.

Moreover, since both electromagnetic plates 69 and 70 for generating a magnetic attracting force are arranged at the side of the movable platen 68 away from the stationary platen 66, they do not get in the way when the molds 65 and 67 are changed.

As described above, in the present invention, since the stationary and movable electromagnetic plates are arranged at the side of the movable platen away from the stationary platen and, at the same time, a combined mechanism of the nut member and the feed screw shaft is operated to move the movable platen, a mold clamping force can be surely provided even in the case where the position of the movable platen is changed. This eliminates the need for adjusting the thickness of the molds when the molds are changed, and accordingly, the operation for changing the molds is simplified and the time of operation can be shortened.

Furthermore, since the mold clamping operation, for which a greater force is required, is performed using a magnetic attracting force from the magnetic attracting force-generating means, a stable mold clamping force can be provided and, at the same time, a smaller-sized feed mechanism for the movable platen can be produced.

What is claimed is:

1. A mold clamping device in an injection molding machine, which comprises:
   a stationary piston on which a stationary side mold is mounted;
   a movable platen in which a movable side mold is mounted in a position opposite said stationary side mold;
   a stationary electromagnetic plate disposed in a position away from said stationary platen with said movable platen interposed therebetween;
   a movable electromagnetic plate disposed opposite a side of said stationary electromagnetic plate and movable relative to said stationary electromagnetic plate;
   a magnetic attracting force generating means provided in at least one of said stationary electromagnetic plate and said movable electromagnetic plate;
   tie bar means arranged between said stationary platen and said stationary electromagnetic plate, for guiding the movement of said movable platen; and
   a platen driving means for moving said movable platen.

2. A mold clamping device as claimed in claim 1, wherein said platen driving means comprises a screw shaft; a nut member which is adapted to engage said screw shaft; and a rotation driving means for driving in rotation any one of said screw shaft and said nut member.

3. A mold clamping device as claimed in claim 2, wherein said screw shaft is fixedly connected to said movable platen, and said nut member is rotatably held in said movable electromagnetic plate and is connected to said rotation driving means.

4. A mold clamping device as claimed in claim 2, wherein said screw shaft is rotatably held in said movable electromagnetic plate and connected to said rotation driving means, and said nut member is fixedly connected to said movable platen.

5. A mold clamping device as claimed in claim 2, wherein said screw shaft is fixedly connected at one end to said movable electromagnetic plate and slidably supported at the other end by said stationary platen, and said nut member is rotatably held in said movable platen and connected to said rotation driving means.

* * * * *